(12) United States Patent
Okino et al.

(10) Patent No.: US 6,661,544 B1
(45) Date of Patent: Dec. 9, 2003

(54) IMAGE READING APPARATUS

(75) Inventors: Yoshiharu Okino, Kanagawa (JP);
Masaaki Konno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/310,977

(22) Filed: May 13, 1999

(30) Foreign Application Priority Data

May 27, 1998 (JP) .......................... 10-145701

(51) Int. Cl.⁷ .............................. H04N 1/46; H04N 1/04
(52) U.S. Cl. ................ 358/506; 358/509; 358/484; 358/487
(58) Field of Search ................ 358/509, 506, 358/505, 514, 511, 512, 475, 484, 474; 362/800; 355/56; 250/234–236

(56) References Cited

U.S. PATENT DOCUMENTS

| | | | | |
|---|---|---|---|---|
| 5,355,234 A | * | 10/1994 | Kim ............................ | 358/512 |
| 5,499,112 A | * | 3/1996 | Kawai et al. ................ | 358/475 |
| 5,673,125 A | * | 9/1997 | Merecki et al. ............. | 358/487 |
| 6,042,013 A | * | 3/2000 | Fork ............................ | 235/469 |
| 6,191,872 B1 | * | 2/2001 | DeCaro ....................... | 358/509 |
| 6,292,276 B1 | * | 9/2001 | DeCaro ....................... | 358/475 |
| 6,333,778 B1 | * | 12/2001 | Katakura et al. ............. | 355/56 |

* cited by examiner

*Primary Examiner*—Cheukfan Lee
(74) *Attorney, Agent, or Firm*—Sughrue Mion, PLLC

(57) ABSTRACT

Since amounts of illuminated light of each color are well-balanced by using a light source generating a small amount of heat and emitting light of a high color temperature during light emission, images can be read at high speed and with high accuracy. LED chips are applied for a light source, and are arranged by color so as to form substantially straight lines on an aluminum substrate, at a high density. Emitted light is made to be incident on a photographic film via an acrylic block. Since light emitted from the LED chips 64 has a high color temperature and includes a large amount of light of short wavelengths, an SN ratio of a read image is excellent and the image can be read at high speed. A heat pipe is piped at the rear surface side of the aluminum substrate and a coolant is circulated inside the pipe. Since heat generated by the LED chips is transmitted to the heat pipe through a heat exchange action between the light source and the coolant, the amount of light emitted from the LED chips 64 does not fluctuate.

11 Claims, 4 Drawing Sheets

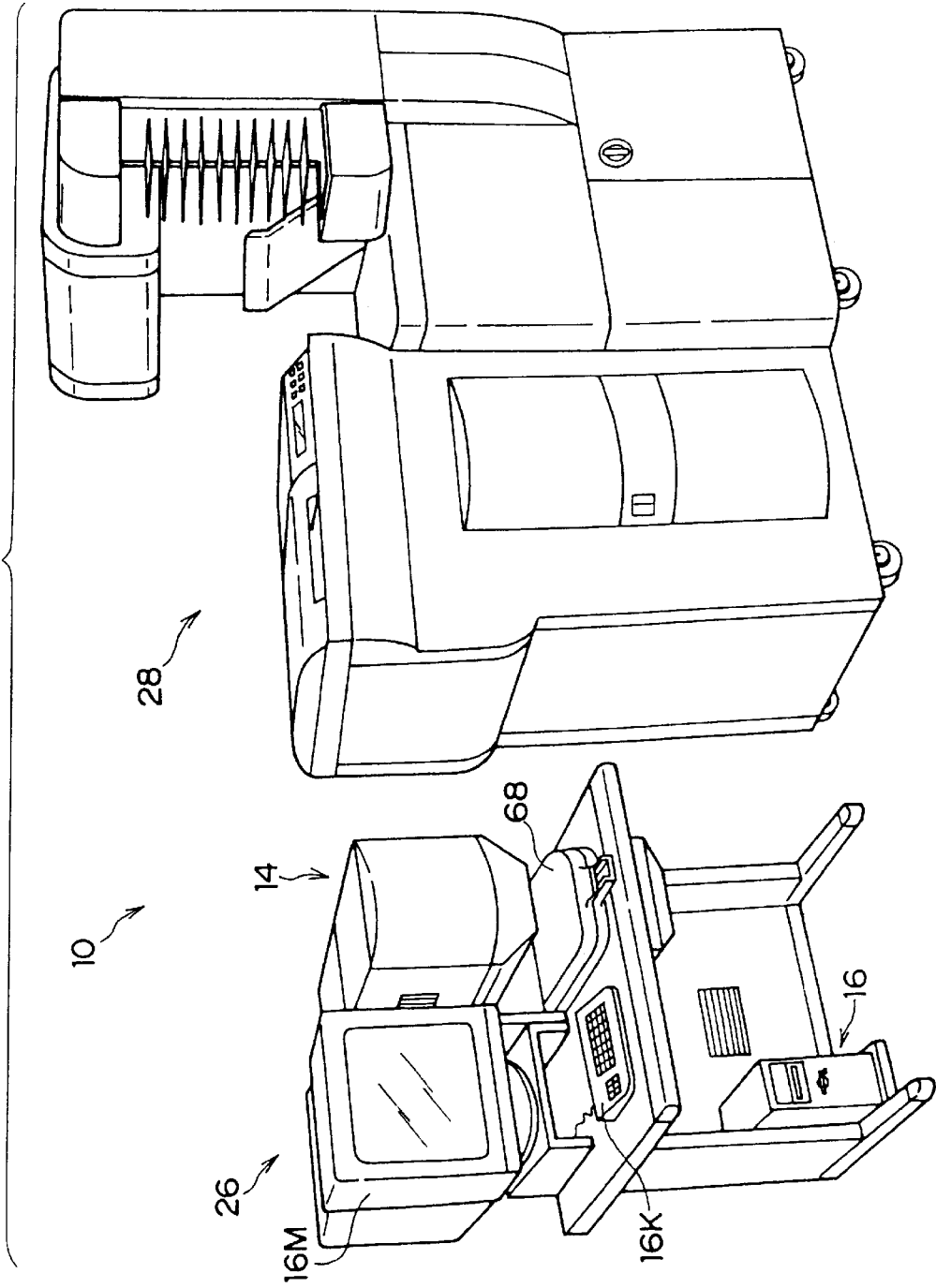

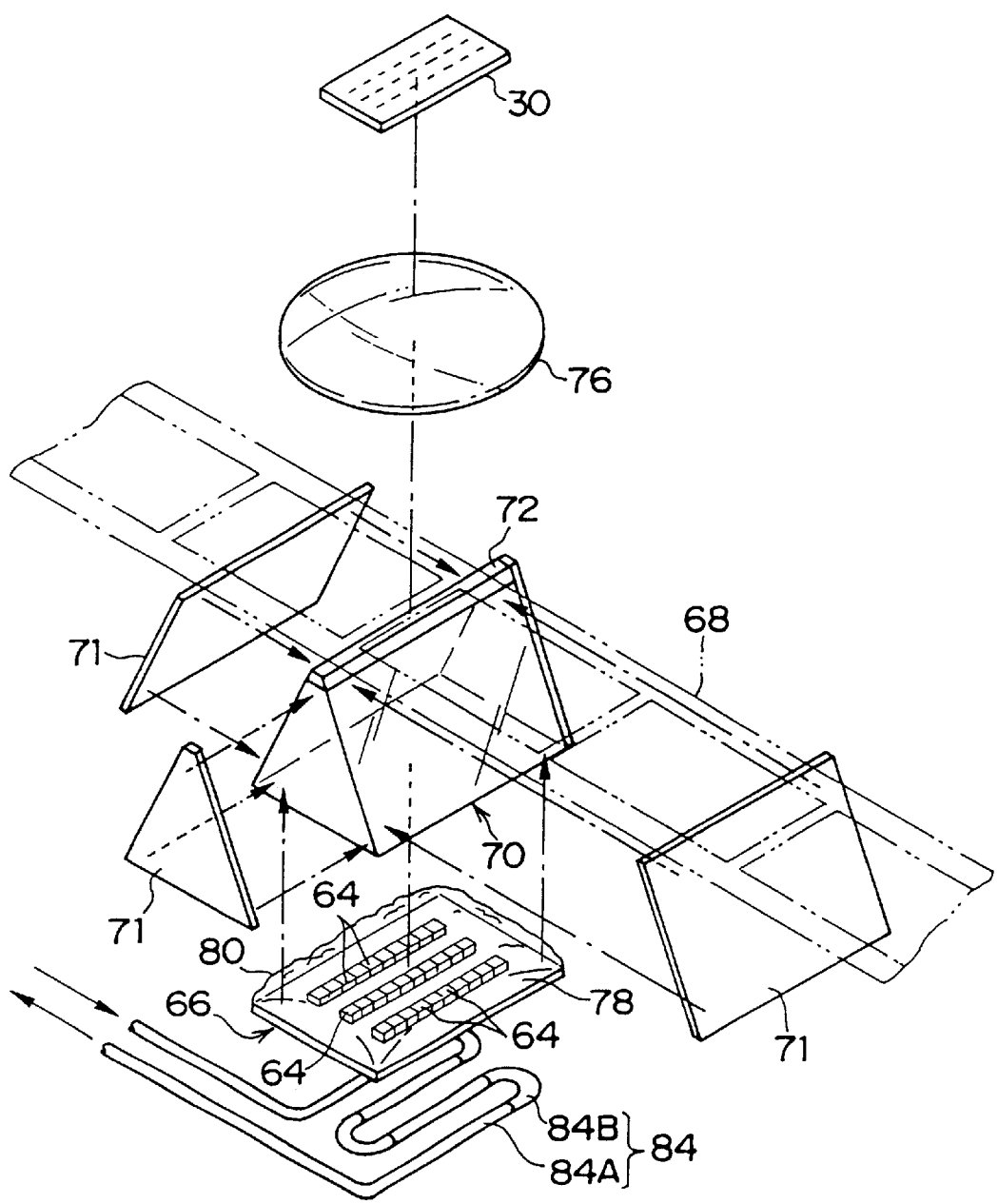

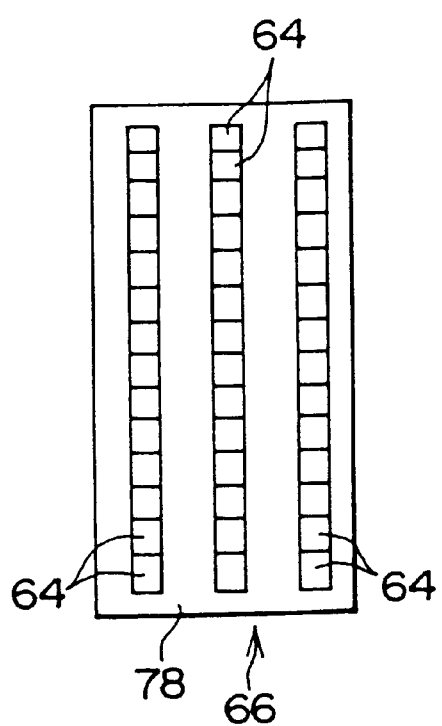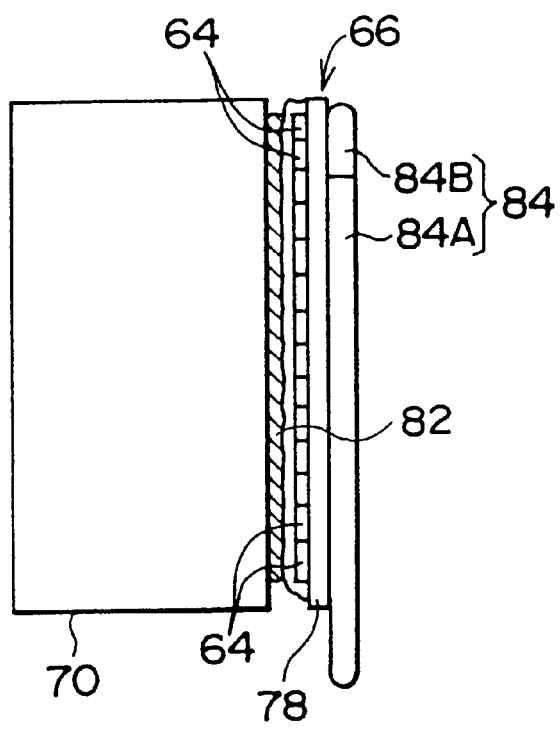

IMAGE READING APPARATUS

BACKGROUND OF THE INVENTION

1. Field of the Invention

The present invention relates to an image reading apparatus in which, while a film having a plurality of frame images formed thereon is conveyed, a plurality of the frame images are read by reading light emitted from a light source and transmitted through or reflected from the frame images, by using a line scanner.

2. Description of the Related Art

In recent years, a technique is known in which frame images recorded on a photographic film are optically read by a reading sensor such as a CCD (charge coupled device) or the like, image processing such as enlargement and/or contraction, various corrections, or the like is performed with respect to digital image data obtained from the aforementioned reading, and an image is thereby formed on a recording material by using laser light which is modulated on the basis of digital image data for which the image processing has been completed.

In such a technique in which frame images are digitally read by the reading sensor such as the CCD or the like as described above, in order to realize highly accurate image reading, frame images are read preparatorily (so-called prescanning), reading conditions in accordance with densities or the like of frame images (for example, amount of light to be irradiated onto the frame images, time during which charge is accumulated in the CCD or the like) are determined, and the frame images are again read on the basis of the determined reading conditions (so-called fine scanning).

In this case, since prescanning can be performed with relatively low image-reading accuracy, prescanning has a relatively high tolerance for irregularity in the speed at which a recording material is conveyed. On the other hand, since fine scanning must be performed at as high speed as is possible and with extremely high image-reading accuracy, fine scanning has an extremely limited tolerance for variation in the amount of light or noise generated when frame images are read.

However, because a conventional halogen lamp that has been in general use for printing exposure or the like generates an excessive amount of heat, light emission efficiency deteriorates, and increasing the speed for reading images is thereby restricted.

Although the halogen lamp is the most suitable light source for a printing exposure in which the light source is transmitted through a negative film so as to print an image directly on a printing paper, as described above, in a system in which the image is read by the CCD, since the halogen lamp has a low color temperature, and emits a low amount of light having a short wavelength (bluish colors when speaking in terms of color), and the SN ratio of the image read thereby deteriorates (includes an excessive amount of red when speaking in terms of color). Also, the halogen lamp hinders images from being read at high speed.

In order to solve this, a discharge lamp having a high color temperature (e.g., a xenon lamp or a metal halide lamp) can be thought of, as a light source. However, there is a drawback in that discharge noise is generated so that images cannot be read with high accuracy.

SUMMARY OF THE INVENTION

It is an object of the present invention to provide an image reading apparatus in which the illumination light amount for each color is well-balanced by using a light source that generates a small amount of heat during light emission thereof and has a high color temperature, such that an image can be read at high speed and with high accuracy.

A first aspect of the present invention is an image reading apparatus that, while a film having a plurality of frame images recorded thereon is conveyed, reads a plurality of said frame images by reading light emitted by a light source and transmitted through or reflected from said frame images, using a line scanner, wherein said light source comprises: a plurality of light emitting elements that emit lights of colors corresponding to light having substantially the same wavelengths; and a photoconductive member that includes a light entering surface which faces said plurality of the light emitting elements and into which light emitted by said plurality of light emitting elements enters, and a light exiting surface which faces said film and from which light that enters the light entering surface exits.

In accordance with the first aspect of the present invention, the light emitting elements generally emit a small amount of light, but the color temperature is high and a large amount of the light has short wavelengths. Thus, light having such characteristics as described above enters the light entering surface and exits from the light exiting surface losing almost no light. Because a film is placed so as to face this light exiting surface, almost the entire amount of light that exits the light exiting surface can be irradiated onto the film.

As described above, generally, the light emitting elements emit a small amount of light. In accordance with the first aspect of the present invention, a plurality of these light emitting elements are applied to assure a necessary amount of light. In the present invention, because a light source is selected giving weight to how high the color temperature is, rather than selecting a light source that outputs a large amount of light at a time, an insufficient amount of light is compensated for by the number of light sources. Accordingly, for example, even when a CCD line sensor or the like is used as a line scanner, the SN ratio of an image when the image is read can be improved.

A second aspect of the present invention is an image reading apparatus according to the first aspect of the present invention, wherein said wavelengths are that of lights of three colors consisting of B (blue), G (green), and R (red).

In accordance with the second aspect of the present invention, when a color image is read, light emitting elements of the three colors, i.e., B (blue), G (green), and R (red) must be used. The light emitting elements having wavelengths corresponding to each of the three colors are disposed. Accordingly, in a case in which the light emitting elements of the three colors are mixed with one another, white light can be created.

A third aspect of the present invention is an image forming apparatus according to the first aspect of the present invention, wherein said plurality of said light emitting elements are arranged so as to form straight lines, at a high density.

In accordance with the third aspect of the present invention, the plurality of the light emitting elements are arranged so as to form substantially straight lines, at a high density, along the direction in which the line scanner scans, for example. Accordingly, reading cells (pixels) of the line scanner are divided in accordance with the number of the light emitting elements are parted into pluralities of pixels. Thus, a necessary (corresponding) amount of light can be provided. In this case, since the light emitting elements have a high color temperature and can be irradiated stably with high illuminance, color unevenness is not caused among the light emitting elements.

A fourth aspect of the present invention is an image reading apparatus according to claim 1, wherein the plurality of the light emitting elements are LEDs.

In accordance with the fourth aspect of the present invention, the LED is a most suitable light emitting element. The LED can easily control light, can be manufactured inexpensively, and has a long life. Namely, the LED is most suitable, as a light emitting element that can satisfy both direct requirements such as color temperature and the like, and indirect requirements such life length as described above.

A fifth aspect of the present invention is an image reading apparatus according to the first aspect of the present invention, wherein a reflecting member having a predetermined reflectance is adhered to surfaces of the photoconductive member other than the light entering surface and the light exiting surface such that the reflecting surface of the reflecting member faces inward.

In accordance with the fifth aspect of the present invention, light incident on the photoconductive member is reflected off the surfaces other than the light exiting surface by the reflecting member. Accordingly, there is no difference between the amount of light that enters the light entering surface and the amount of light that exits from the light exiting surface. As a result, it is possible to increase an effective amount of light.

A sixth aspect of the present invention is an image reading apparatus according to the second to the fifth aspects of the present invention, wherein the lights of the three colors are mixed evenly with one another and irradiated onto the film.

In accordance with the sixth aspect of the present invention, the light emitting elements of three colors are mixed evenly with one another so that white light can be formed and irradiated onto a film. Accordingly, an image of the same region of the film is formed on each of the reading portions of the line sensor corresponding to each of the colors of the light emitting elements. As a result, the same image can be read at once.

A seventh aspect of the present invention is an image recording apparatus according to the second to fifth aspects of the present invention, wherein the lights of the three colors are respectively irradiated onto different regions of the film in a state in which the three colors are separated from one another.

In accordance with the seventh aspect of the present invention, lights emitted by the light emitting elements of the three colors are introduced independently from one another, and are irradiated onto the different regions of the film. Since the line sensor receives transmitted light or reflected light from each of the regions of the film, color separation ability can be improved.

BRIEF DESCRIPTION OF THE DRAWINGS

FIG. 2 is an external view of the digital lab system.

FIG. 3 is a perspective view of a schematic structure of an optical system of a line CCD scanner.

FIG. 4A is a plan view of a light source, and FIG. 4B is a right-hand side view of FIG. 4A.

DESCRIPTION OF THE PREFERRED EMBODIMENTS

Figure 1:
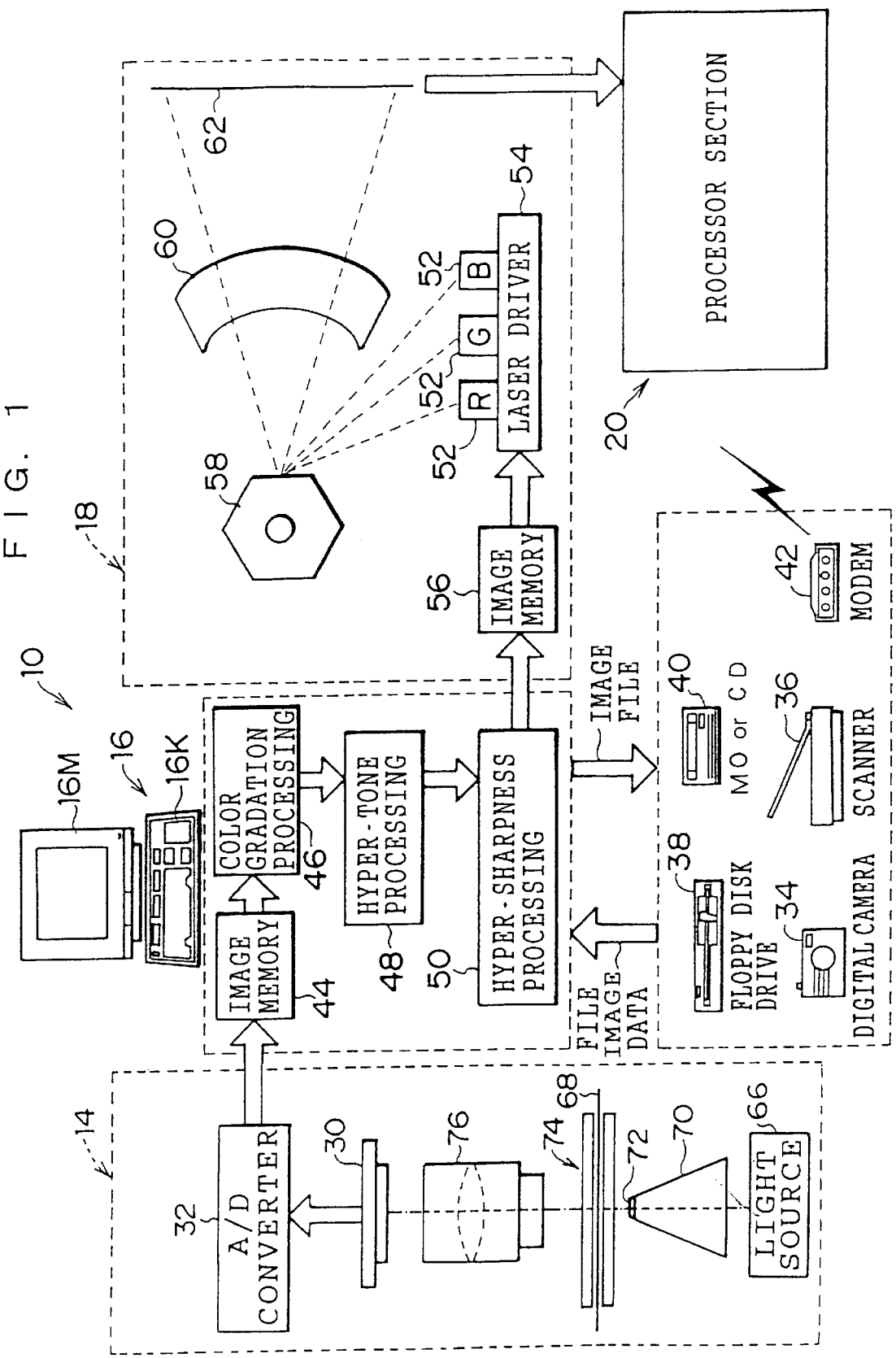
FIG. 1 is a schematic structural view of a digital lab system according to an embodiment of the present invention.

A schematic structure of a digital lab system 10 according to an embodiment of the present invention is shown in FIGS. 1 and 2.

As shown in FIG. 1, this digital lab system 10 comprises a line CCD scanner 14, an image processing section 16, a laser printer section 18, and a processor section 20. The line CCD scanner 14 and the image processing section 16 are integrated with each other as an input section 26 which is shown in FIG. 2. The laser printer section 18 and the processor section 20 are integrated with each other as an output section 28 which is also shown in FIG. 2.

The line CCD scanner 14 is used to read frame images which are recorded on a photographic film such as a negative film, a reversal film or the like and is able to read frame images of, for example, a 135-size photographic film, a 110-size photographic film, a photographic film on which a transparent magnetic layer is formed (a 240-size photographic film: a so-called APS film), and 120-size and 220-size (Brownie size) photographic films. The line CCD scanner 14 reads the frame images that are subject to be read, by using a line CCD 30. After the read frame images have been converted from analog to digital (A/D) at an A/D conversion section 32, image data is output to the image processing section 16.

In the present embodiment, the digital lab system 10 in a case in which, for example, a 135-size photographic film 68 is applied will be explained.

The image processing section 16 is structured in such a manner as described below. Image data output from the line CCD scanner 14 (scanned image data) is input to the image processing section 16, and image data obtained by photographing using a digital camera 34 or the like, image data obtained by reading an original (e.g. a reflection copy or the like) using a scanner 36 (a flat-bed type scanner), image data generated by another computer and recorded in a floppy disc drive 38, an MO (magneto-optical) or CD drive 40, and communication image data which is received through a modem 42 or the like (which is referred to as file image data hereinafter) can also be input thereto from the external devices.

The image processing section 16 stores the input image data in an image memory 44, carries out various types of image processing at a color gradation processing section 46, a hyper-tone processing section 48, a hyper-sharpness processing section 50, and the like, and then outputs the image-processed image data as image data for recording, to the laser printer section 18. The image processing section 16 can also output the image-processed image data as an image file, to the external devices (for example, outputting to a storage medium such as an FD, MO, CD or the like or transmitting to another information processing equipment through communication lines).

The laser printer section 18 has laser sources 52 of R, G, and B, and controls a laser driver 54 so as to irradiate laser light onto a printing paper 62, which is modulated on the basis of image data for recording (which is once recorded in an image memory 56) which is input from the image processing section 16. In the present embodiment, an image is recorded onto the printing paper 62 through scanning exposure using an optical system in which a polygon mirror 58 and an fθ lens 60 are mainly employed. Further, in the processor section 20, each of a color developing processing, bleaching/fixing processing, rinsing processing, and drying processing is applied to the printing paper 62 on which an image has been formed by scanning exposure at the laser printer section 18. As a result, image is formed on the printing paper 62.

(Structure of Line CCD Scanner)

A description of the structure of the line CCD scanner 14 will be given hereinafter. A schematic structure of an optical system of the line CCD scanner 14 is shown in FIG. 3. This optical system is comprised of a plurality of LED (light emission diode) chips 64, and has a light source 66 which irradiates light onto a photographic film 68. An acrylic block 70 as a photoconductive member that diffuses light irradiated onto the photographic film 68 into diffused light, and a light diffusion plate 72 are disposed in that order at a light emission side of the light source 66.

This acrylic block 70 has a predetermined transparency (theoretically, 100% is preferable) and an index of refraction of between 1.2 and 1.9.

The photographic film 68 is conveyed by a film carrier 74 disposed at a light exiting side of the acrylic block 70 (at the side at which the light diffusion plate 72 is disposed) such that an image plane of a frame image is provided orthogonal to an optical axis of the light source 66.

The surface of the acrylic block 70 that faces the photographic film 68 is smaller than the surface thereof that faces the light source 66. In other words, the acrylic block 70 is formed in a trapezoidal shape when viewed from a side thereof, and preferably, a short side of the acrylic block 70 (a side parallel to the conveying direction of the photographic film 68) is less than or equal to 3 mm, and a long side thereof is greater than or equal to 20 mm.

Surfaces of the acrylic block 70 other than a light entering surface into which light enters and a light exiting surface from which light exits are covered with a covering member whose reflectance is greater than or equal to 70%. This covering member can be formed from, for example, a solid member such as a metal or a thin film coating member such as a dielectric multi-layered film or the like.

A lens unit 76 which focuses light transmitted through the frame images and the line CCD 30 are disposed in that order along the optical axis at the side of the photographic film 68 opposite to the light source 66. Further, although a single lens is illustrated as the lens unit 76, the lens unit 76 is actually a zoom lens formed by a plurality of lenses. Moreover, a SELFOC lens can be used as the lens unit 76. In this case, it is desirable to place respective end surfaces of the SELFOC lens so as to be as close as possible to the photographic film 68 and the line CCD 30.

The line CCD 30 has a plurality of CCD cells which are arranged in a row in a widthwise direction of the photographic film 68 (in a direction orthogonal to the conveying direction of the photographic film 68), and has three lines of sensing portions which have an electronic shutter mechanism and which are provided so as to be spaced apart from one another and parallel to one another. One of R, G, and B color separation filters is attached to each of the sensing portions at the side thereof into which light enters (a so-called 3 line color CCD). The line CCD 30 is disposed such that a light receiving surface of each of the sensing portions corresponds to a focus point position of the lens unit 76.

A cell pitch (pixel pitch) of this line CCD 30 is 100 μm. With this cell pitch, an ordinary image can be read with high resolution (10 pixels/1 mm).

In order to read an image which is recorded on a silver salt photographing photosensitive material, a pixel pitch of the line CCD 30 is preferably 50 μm (20 pixels/1 mm).

A transferring portion corresponding to each of the sensing portions is provided near each sensing portion. Charge accumulated in each of the CCD cells of each of the sensing portions is transferred sequentially through the corresponding transferring portion. Although it is not illustrated, a shutter is disposed between the line CCD 30 and the lens unit 76.

FIG. 4A is a view illustrating the light source 66 when viewed from a flat surface, i.e., when viewed from a side of the photographic film 68, and FIG. 4B is a side view of FIG. 4A.

The LED chips 64 of each of R, G, and B colors are attached to an aluminum substrate 78 and are disposed along the three lines of the sensing portions which are provided at the line CCD 30 for the detection of each color.

Heat conductivity of the aluminum substrate 78 is greater than or equal to 10W/m·K, and is subject to substantially the whole amount of heat generated through light emission by the LED chips 64. Further, provided that heat conductivity is higher than or equal to 10W/m·K, instead of the aluminum substrate 78, a copper substrate or the like can be used.

Each of the LED chips 64 is coated by a protective coat 80. This protective coat 80 is adhered to the acrylic block 70 with a transparent adhesive 82. The protective coat 80 and the transparent adhesive 82 have substantially the same index of refraction as the acrylic block 70.

Almost the whole amount of light of each of the R, G, and B colors emitted from the LED chips 64 is led toward the light diffusion plate 72 via the protective coat 80, the adhesive 82, and the acrylic block 70, and then is incident upon the photographic film 68 in a state in which light of all of the three colors are mixed evenly with one another.

Since light emitted from the LED chips 64 has a high color temperature and a large amount of light of short wavelengths, the SN ratio of the image recorded on the photographic film 68 is excellent. Accordingly, the LED chips 64 are suitable for reading images at high speed. Further, because the present invention is structured as described above, an insufficient amount of light is compensated for by placing a plurality of the LED chips 64 of the same color on the aluminum substrate 78 at a high density.

A heat pipe 84 is disposed at the rear surface side of the aluminum substrate 78 in a state in which a portion of the heat pipe 84 is kept in contact with the aluminum substrate 78. Straight tube portions 84A of the heat pipe 84 are laid on the side of the rear surface of the aluminum substrate 78 along positions at which the LED chips 64 are mounted. The end portions of the straight tube portions 84A are alternately connected to U-shaped tubes 84B. Further, end portions of the heat pipe 84 are connected to a compressor (not shown) which discharges a coolant. The coolant discharged from one end portion of the heat pipe 84 passes through the rear surface of the aluminum substrate 78 and reaches the other end portion thereof.

Due to the circulation of this coolant, it is possible to radiate heat of the aluminum substrate 78 caused by the light emission of the LED chips 64, through a heat exchange action.

An operation of the present embodiment will be described hereinafter.

When an operator inserts the photographic film 68 into the film carrier 74, and gives instructions to start reading the frame images using a key board 16K, the film carrier 74 begins to convey the photographic film 68. Prescanning can be performed due to this conveyance. Namely, while the photographic film 68 is conveyed at a relatively high speed, various data other than the frame images and image recording regions of the photographic film 68 is read by the line scanner 14. The read image is displayed on a monitor 16M.

At this time, the size of a frame image is recognized, and for example, in a case in which the frame image has a panoramic size, an empty portion specific to a panoramic size image (portions at both ends of the photographic film in the widthwise direction thereof) is shaded.

Reading conditions at the time of fine scanning are determined for each of the frame images on the basis of the results of prescanning for each of the frame images.

After setting the reading conditions during fine scanning for all of the frame images, the photographic film 68 is conveyed in a direction opposite to the direction of prescanning, and fine scanning is then performed for each of the frame images.

At this time, since the photographic film 68 is conveyed in the direction opposite to the direction of prescanning, fine scanning is performed from a final frame to a first frame. Since the speed of fine scanning is set to be lower than that of prescanning, fine scanning results in a reading resolution which is higher than that of prescanning. Further, at the time of prescanning, because image conditions (e.g., an aspect ratio of a photographed image, photographing conditions such as underexposure, normal exposure, over exposure, super overexposure, or the like, use or nonuse of flash photographing or the like) is recognized, the image can be read under appropriate reading conditions.

Instead of a halogen lamp or a xenon lamp, which have been frequently used conventionally, the LED chips 64 are employed as the light source 66 applied to the line CCD scanner 14 according to the present embodiment.

These LED chips 64 corresponding to each of the colors are respectively arranged so as to form substantially straight lines on the aluminum substrate 78, at a high density. Accordingly, it can be ensured that a sufficient amount of light is received by each of the cells.

Since light emitted by the LED chips 64 is guided in the direction of the light diffusion plate 72 via the protective coat 80, the adhesive 82, and the acrylic block 70, the lights of each of the colors are mixed evenly with one another, and light incident upon the photographic film 68 is thereby made even. If the surface of the photographic film 68 becomes abraded, influence of abrasion with respect to an image to be read can be restrained to the minimum because diffusion distribution is increased by the light diffusion plate 72.

Since the light diffusion plate 72 and the film carrier 74 are provided so as to be very close to each other, the loss of light due to having increased diffusion distribution can be suppressed.

Because the LED chips 64 have a high color temperature and a large amount of light having short wavelengths, the SN ratio of the read image is excellent, and images can be read at high speed. In other words, more than other sources such as halogen lamps or the like, the LED chips 64 are the most suitable light source for reading an image.

Although there has been a drawback in that the LED chips 64 emit insufficient amounts of light, in the present embodiment, the insufficiency in the amount of light can be compensated for by arranging a plurality of the LED chips 64 on the aluminum substrate 78 at a high density.

The amount of heat generated increases by the LED chips 64 emitting light. The amount of light emitted from the LED chips 64 may vary in accordance with the amount of heat generated by the LED chips 64. For this reason, in the present embodiment, the heat pipe 84 is piped at the side of the rear surface of the aluminum substrate 78, and the coolant is circulated therein. Accordingly, since the amount of heat generated from the LED chips 64 is transmitted to the heat pipe 84 through a heat exchange action between the coolant and the LED chips 64, the amount of light emitted from the LED chips 64 does not fluctuate.

In the present embodiment, the LED chips 64 are classified by color, and each of the LED chips 64 classified by color is arranged so as to form a line. However, the LED chips 64 can be arranged arbitrarily on the aluminum substrate 78 on the basis of the amount of light emitted from the LED chips 64, so that the light entering the acrylic block 70 is white light.

In the present embodiment, although the acrylic block 70 is used as a photoconductive member, another material such as glass or the like can be used if it has a predetermined degree of transparency and an index of refraction of between 1.2 and 1.9.

In the present embodiment, light from the LED chips 64 provided at the light source 66 is mixed evenly and made to be incident on the photographic film 68. The filters for color separation are provided at the line CCD 30. However, if when light enters the acrylic block 70, the light is separated by color using the filters, and at the light exiting end of the acrylic block 70, the light is in a color separated state and irradiated on different regions of the photographic film 68, the filters for color separation are not necessary, since the frame image for which color separation has been completed can be read directly at the line CCD 30. In this case, taking into consideration the offset amounts in the reading positions of each color, improvements such as providing delay times during image processing become necessary.

As the LED chips 64, LED chips having a typical structure in which light emitting chips are embedded in a rectangular resin block has been used in the present embodiment. However, reflection type LED chips in which chips are placed at a position light converges on a parabola-shaped reflecting plate, can be used instead. Because light emitted from the chips is reflected by the aforementioned reflecting plate and exits as light that is substantially in parallel, the reflection type LED chip is suitable for a structure in which an image is read through color separation.

In the present invention, an excellent effect can be obtained in that the amounts of illumination light for each of colors are well-balanced by using a light source having a small amount of heat during light emission and having a high color temperature such that an image can be read at high speed and with high accuracy.

What is claimed is:

1. An image reading apparatus, comprising:
    a conveyor mechanism to convey a film having a plurality of frame images recorded thereon;
    a light source to emit light such that the light is transmitted through or reflected from the plurality of frame images recorded on the film; and
    a line scanner to read the light transmitted through or reflected from the plurality of frame images recorded on the film;
    wherein said light source comprises:
        a first plurality of light emitting elements, each light emitting element of the first plurality of light emitting elements emitting light of a first color having a substantially same, first wavelength;
        a second plurality of light emitting elements, each light emitting element of the second plurality of light emitting elements emitting light of a second color having a substantially same, second wavelength;
        a third plurality of light emitting elements, each light emitting element of the third plurality of light emitting elements emitting light of a third color having a substantially same, third wavelength; and
        a photoconductive member having a light entering surface, which faces said first, second, and third plurality of light emitting elements and into which light emitted by said first, second, and third plurality of light emitting elements enters, and having a light exiting surface, which faces said film and from which light that enters the light entering surface exits, wherein said photoconductive member has a generally trapezoidal cross section.

2. An image reading apparatus according to claim 1, wherein said first, second, and third wavelength are that of lights of three colors comprising B (blue), G (green), and R (red), respectively.

3. An image reading apparatus according to claim 1, wherein said first, second, and third plurality of light emitting elements are arranged so as to form straight lines at a high density.

4. An image reading apparatus according to claim 1, wherein said first, second, and third plurality of light emitting elements are LEDs.

5. An image reading apparatus according to claim 1, wherein a reflecting member having a predetermined reflectance is adhered to surfaces of the photoconductive member other than said light entering surface and said light exiting surface such that the reflecting surface of said reflecting member faces inward.

6. An image reading apparatus according to one of claims 2 to 5, wherein the lights of said three colors are mixed evenly with one another and irradiated onto said film.

7. An image reading apparatus according to one of claims 2 to 5, wherein said lights of said three colors are respectively irradiated onto different regions of said film in a state in which said three colors are separated from one another.

8. An image reading apparatus according to claim 1, wherein said light entering surface has a surface area greater than that of said light exiting surface.

9. An image reading apparatus according to claim 1, wherein said light entering surface forms the base side of said generally trapezoidal cross section, and said light exiting surface is disposed opposite to said light entering surface to form the top side of said generally trapezoidal cross section.

10. An image reading apparatus according to claim 1, wherein said photoconductive member has an index of refraction between 1.2 and 1.9.

11. An image reading apparatus that, while a film having a plurality of frame images recorded thereon is conveyed, reads a plurality of said frame images by reading light emitted by a light source and transmitted through or reflected from said frame images, using a line scanner, wherein said light source comprises:

a plurality of light emitting elements that emit lights of colors corresponding to light having substantially the same wavelengths; and a photoconductive member that includes a light entering surface which faces said plurality of light emitting elements and into which light emitted by said plurality of light emitting elements enters, and a light exiting surface which faces said film and from which light that enters the light entering surface exits;

wherein a reflecting member having a predetermined reflectance is adhered to surfaces of the photoconductive member other than said light entering surface and said light exiting surface such that the reflecting surface of said reflecting member faces inwardly; and the photoconductive member has a generally trapezoidal cross section.

\* \* \* \* \*